Patented Mar. 18, 1952

2,590,017

UNITED STATES PATENT OFFICE 2,590,017

FLUID SEAL PACKING

Kenneth H. Knight, Worcester, Mass., assignor to Graton & Knight Company, Worcester, Mass., a corporation of Massachusetts No Drawing. Application September 7, 1946, Serial No. 695,562

4 Claims. (Cl. 117—142)

This invention relates to fluid seal packings and methods of making the same, and more particularly to packings which are effective as liquid and gas seals when used as gaskets and other types of sealing members.

Because of its natural porosity, untreated, tanned leather is not suitable as a gas seal, such as when used as a packing to provide a seal against a vacuum or high pressure. Hence, the porous leather should be impregnated with a pore sealing compound. Leather has been treated with various materials, such as oils, greases and waxes which are usually either of natural origin, such as vegetable or animal, or derivatives or distillation products of petroleum. Various synthetic products have also been used either as a hot melt or else with a solvent as a diluent. However, no single impregnating material or combination has been found heretofore which will give the leather the desired characteristics that will satisfy the objects of my invention.

One object is to produce a fluid seal packing which is impervious to the passage of fluids, such as will seal almost a complete vacuum without appreciable leakage or hold a gas under the pressure of several atmospheres, or provide an efficient seal or packing between gases at different pressures.

A further object of the invention is to provide a packing which is resistant to oils, and especially those of a mineral nature, such as lubricating, fuel and hydraulic oils which are usually encountered in mechanical systems.

Another and important object is to make an impregnated packing of fibrous material which is relatively unaffected by wide temperature variations, such as from —50° C. to above 100° centigrade, so that the packing will maintain its sealing efficiency and not become hard and brittle, due to crystallization or various other changes in the impregnating agent at low temperatures and it will not be lost at the high temperatures to which the article may be subjected.

Another object is to provide an impregnated leather packing which may be subjected to mechanical pressure, even accompanied with high temperature, without material extrusion of the impregnant.

A further object is to produce a leather packing which not only has internal physical characteristics that are stable, but also presents a surface condition that enables the leather to produce a seal against metal parts and make it efficient as a pressure separator. Other objects will be apparent in the following disclosure.

In accordance with this invention, I propose to make a porous fibrous body, and particularly leather, meet these desired objects by impregnating it with a plastic gel formed of a continuous phase of ethyl cellulose having dispersed therein the glyceride of an hydroxylated fatty acid having 16 or 18 carbon atoms, and specifically castor oil which is primarily the glycerine ester of ricinoleic acid.

Various types and grades of ethyl cellulose are available on the market and each of these standard types may be used for my purposes. Ethyl cellulose is a cellulose ether formed by reacting alkali cellulose with ethyl chloride. The cellulose molecule is considered to be a chain of anhydro glucose units linked together by oxygen bridges, and each glucose unit has three replaceable OH groups, all or a part of which may be reacted to substitute ethyl therefor. The reaction product may be a completely substituted triethyl cellulose (54.88% ethoxyl) which has limited solubility, or only a part of the hydroxyl groups may be replaced. The standard commercial products have a substitution value between about 2.15 and 2.60 ethoxyl groups per glucose unit, or about 43.5 to 50% of ethoxyl content. These types containing from about 43.5 to 50% of ethoxyl are those which I prefer to employ.

Castor oil is a natural oil expressed from the seeds of *Ricinus communis*; and it consists mainly of triricinolein, or the glyceride of two hydroxylated acids—ricinoleic and isoricinoleic acids.

Small quantities of tristearin and the glyceride of dihydroxystearic acid are present. The glyceride of ricinoleic acid has the formula:

When hydrogenated, each double bond opens up with the addition of hydrogen to each of the two unsaturated CH groups. This hydrogenated product is a hard wax, which is compatible with and soluble in castor oil, and it serves to harden or thicken the oil to an extent determined by the relative proportions.

When ethyl cellulose is dissolved in castor oil, a brush heap type of gel is believed to be formed, in which the long chain molecules of ethyl cellulose constitute a continuous phase in a brush like structure and the castor oil is dispersed between the brush or filaments of ethyl cellulose. If the waxy hydrogenated castor oil is also incorporated in the castor oil, the dispersed globules or masses of oil in the ethyl cellulose phase then consist of a solution of the hydrogenated oil in the chemical unaltered castor oil, and the composite gel is thus made harder or stiffer.

The gel comprising ethyl cellulose and castor oil is a highly viscous and tacky fluid gel which will remain in its colloidal condition within a wide temperature range. The many desirable characteristics of the gel which are due to the addition of ethyl cellulose to castor oil include: a higher melting or softening point, increased viscosity, decreased surface tackiness, high film toughness, low temperature flexibility, freedom from crystallization, a faster drying rate, and a decreased inflammability. Ethyl cellulose is highly resistant to oxygen at high pressures and room temperatures, so that there is no detectable trace of oxidation. It is not materially affected by water. The hydroxylated fatty oil has the unique property of being relatively immiscible with oils derived from petroleum, and the gel containing that oil is therefore unaffected by such mineral oils. These properties are also given to the mixture so that a fibrous body impregnated therewith will form a fluid seal and be resistant to the moisture in gas as well as to the gas itself.

The characteristics of this gel may be varied widely by varying the proportion of the two ingredients, ethyl cellulose and the castor oil, and also by using the different types of ethyl cellulose. The viscosity of the natural chemically unaltered castor oil at room temperature is approximately 50 centipoises, while at 100° C., it is about 20 cp.; by the addition of ethyl cellulose, the viscosity will rise to over 10,000 cp. when the mixture is hot, and this upon cooling is a hard jelly. The various types of ethyl cellulose also have a marked effect on the properties of the gel. As the ethoxyl content of the ethyl cellulose increases, the softening and melting points decrease. Also, the material having the higher ethoxyl content has a greater solubility in solvents and a greater compatibility with plasticizers and oils than have those of lower ethoxyl content. Increasing the ethoxyl content decreases the water absorption. The ethyl cellulose having 43.5 to 50% of ethoxyl gives a desired compromise of these properties.

Although wide variations in proportions may be made, I prefer to use gels in which the ethyl cellulose content ranges from 5 to 50% by weight of the total gel, and for a highly effective seal I prefer that the ethyl cellulose constitute from about 10 to 30% of the gel for impregnating leather to be used as a packing. The remainder is chiefly natural castor oil or the glycerine ester of the hydroxylated fatty acid having 16 or 18 carbon atoms; but other ingredients may be incorporated therein, as desired to modify the properties of the gel.

This gel of ethyl cellulose and the natural chemically unaltered castor oil may be used alone as an impregnant for leather. The gel may be introduced into the leather pores by first heating it to a temperature sufficient to reduce the viscosity to a degree that will enable its penetration into the pores. It is sometimes feasible to add an organic solvent to the mixture in order to use a treating temperature that is consistent with the nature of the leather to be used. For this purpose, an aromatic solvent such as xylene is efficient. However, other types, e. g., the higher alcohols and mixtures are usable. The evaporation of the solvent leaves some voids in the leather.

I may also incorporate some of the waxy hydrogenated castor oil in the natural castor oil in order to increase the stiffness of the final gel. The wax may constitute from zero to 30% by weight of the castor oil portion of the gel. The unaltered castor oil forms the major ingredient of the dispersed phase, and the wax is used only in sufficient amount to make a gel of a required stiffness. This wax is soluble in the natural oil and so goes with the dispersed phase. It has the peculiar property of making the gel more fluid when heated to the required temperature for impregnating the leather pores, and it is not necessary or advisable to use a solvent. Hence the wax results in the leather pores being filled completely, since there is no solvent to be evaporated. Also, the same proportion of ethyl cellulose may be used whether or not the wax is added. Thus, the hydrogenated oil may be used to change the stiffness of the gel without affecting the relative proportions of continuous and dispersed phases, in which case the wax merely replaces some of the castor oil.

A wide variety of gas seal products involving a porous basic fibrous material impregnated with an ethyl cellulose-castor oil gel may be made to meet numerous requirements. As an illustration of such a product and a preferred method of making it, I may make a leather packing which is to be installed on a piston head to seal against the walls of a cylinder containing a lubricating oil, wherein a regulated vacuum in the cylinder actuates the piston which in turn operates a mechanism. This method comprises the following steps.

The leather is tanned, preferably by a chrome tanning operation, and it is then sanded and/or snuffed. The leather may be suitably conditioned, such as by pre-shrinking it overnight in a hot box at a temperature of about 70° C. so as to make it highly permeable to the impregnating solution. This treated leather is then cut and molded and trimmed to provide the desired shape of packing.

An impregnating gel may be made by heating the chemically unaltered castor oil or a synthetic substitute to approximately 200° C. and then adding ethyl cellulose in amount to form 10 to 20% of the total weight. At this temperature, the ethyl cellulose melts, resulting in complete solution with the castor oil. The resultant mass is an extremely viscous, slowly flowing fluid. By stirring the mass, complete solution of the material is promoted, with the dispersion of the oil in the continuous phase of ethyl cellulose. The gel is then cooled to the treating temperature of about 100° C. If desired, a suitable aromatic solvent, such as xylene or a mixture of butanol and xylene, may be added in required proportions to thin the viscous gel sufficiently so that it will satisfactorily impregnate the leather. To this end, I may use 20 parts of xylene per 100 parts of castor oil.

The leather is then impregnated by immersing it in that cut or thinned bath while the solution is held at from 100 to 105° C. for 10 minutes, more or less. The impregnation may be aided by subjecting the leather to a vacuum to remove the air from its pores. Thereafter, the excess of impregnating solution is removed from the surface of the leather and the impregnated article may be baked at about 70° C., which is a suitable temperature well above the boiling point of the thinner, for 10 hours more or less. This heat treatment evaporates or removes all of the xylene solvent and leaves the gel in the leather in its original colloidal and highly viscous condition.

I prefer to avoid the use of a thinning solvent and provide a stiffer gel by substituting the hydrogenated oil wax for not over about 30% by weight of the castor oil. For example, I may substitute the wax for about 15% by weight of the natural oil. For making one type of leather gas seal, I may dissolve 15 parts by weight of the wax in 85 parts of natural castor oil and disperse the solution in 10 parts by weight of ethyl cellulose. These proportions may be widely varied as above specified. This provides a gel that is particularly serviceable for an oil and gas seal. The hydrogenated castor oil wax is introduced into the castor oil at a temperature of about 200° C. at which ethyl cellulose is molten, and the latter may be added either later or at the same time. The mass is stirred suitably to form the desired dispersion. Then the leather is immersed in and impregnated with the gel while the latter is held at a temperature, such as 100° C., at which it is fluid and will enter the leather pores. This step may be aided by applying a vacuum to remove the air from the pores and insure that the leather is completely filled. Upon removing and cooling the leather, the product is ready for use.

The application of this invention to a leather packing demonstrates its advantages. The solution of ethyl cellulose in castor oil, with or without the wax, remains a true colloidal gel showing a softening point that extends over a range of 150° C. or more. Hence, this gel remains as a plastic or viscous seal in the leather throughout the extremes of the temperature range of usage, whereas noncolloidal fluids have well defined melting or softening points which render them unsuited for my purposes. Because this gel remains permanently in a viscous, gelatinous, colloidal condition, it does not permit the leather to dry out or to become hard. The pores of the leather remain filled with the impregnating gel because of its high viscosity and tackiness, which causes it to cling to the walls of the leather pores and seal against metallic surfaces. The gel forms an impervious wall against the passage of gases and liquids. It is not miscible with or soluble in the petroleum lubricating oils of standard usage, and thus the impregnated leather holds back any gas or liquid that might otherwise escape through the leather. Because of its high flexibility, the leather can make a very close and intimate contact with a moving surface and yet the wiping action or the friction of that moving surface on the leather will not remove the gel or otherwise act to produce passages which would destroy the vacuum or allow air or liquid to pass. The high viscosity of the gel, with or without the hydrogenated castor oil wax, prevents it from being exuded from the leather by the heat and pressure to which the leather packing may be subjected. Leather impregnated with ethyl cellulose dissolved in castor oil will maintain its sealing efficiency within a temperature range of below 50° below zero centigrade to above 100° C. without becoming hard and brittle at the sub zero temperatures or losing its impregnating gel at the temperature of 100° C. or higher. The gel is not subject to the disadvantages of impregnants which crystallize at the low temperatures involved, nor is it lost at the higher temperatures by evaporation or because of reduced viscosity. Other advantages will be readily apparent.

Various leather substitutes may be employed in place of the natural leather, provided the substitute is porous and permeable to the gel, and that it has the required strength, resistance to wear and abrasion, flexibility and other physical characteristics which are needed to make an effective gas sealing packing that is not detrimentally affected by lubricating oils and the moisture that may be present in the gas. That is, the substitute leather may be a porous fibrous mass made of felt, asbestos, paper or paper board, woven or laminated cloth or other textile materials and pressed and shaped articles of various cellulosic materials and synthetic substitutes. However, the rather narrow requirements for such gas seal packings usually necessitates that the gel carrier body be leather, and particularly where the packing is employed for the standard uses of gaskets, V-packings, cup packings and vacuum packings and other types of oil and gas seals.

It will be appreciated in view of the above disclosure that wide variations may be made in the method of forming the gel and of impregnating the leather or other porous fibrous base, and that many types and shapes of packing may be made therefrom. Hence, the above disclosure is to be interpreted as setting forth the principles of my invention and preferred embodiments and methods and not as imposing limitations on the scope of the appended claims.

This case is a continuation in part of my copending application Serial No. 593,761, filed May 14, 1945, and now abandoned.

I claim:

1. A fluid seal packing comprising porous tanned leather having its internal continuous pores substantially fully impregnated with a plastic gel comprising essentially a cooled mass formed of a preheated continuous molten phase of ethyl cellulose having castor oil dispersed therein in a chemically unaltered liquid phase.

2. A fluid seal packing comprising porous leather having its internal continuous pores impregnated substantially fully with and sealed by a plastic gel comprising from 5 to 50% by weight of the gel of a continuous phase of ethyl cellulose containing from 43.5 to 50% of ethoxyl which has dispersed therein a liquid phase comprising chemically unaltered castor oil as its major constituent.

3. An article of manufacture comprising porous leather having its internal continuous pores substantially fully impregnated with and sealed by a plastic gel comprising essentially from 5 to 50% by weight of the total gel of a continuous phase of ethyl cellulose having dispersed therein a solution of hydrogenated castor oil in natural chemically unaltered castor oil, whereby said impregnated leather body is stable, impervious to gases and liquids, resistant to lubricating oils, and pliable within a temperature range of at least from —50° C. to above 100° centigrade.

4. A fluid seal packing composed of porous leather having its pores substantially entirely impregnated throughout with and sealed by a plastic gel comprising essentially from 10 to 30% by weight of the total gel of a continuous phase of ethyl cellulose containing from about 43.5 to 50% of ethoxyl which has dispersed therein a solution of hydrogenated castor oil in natural chemically unaltered castor oil, said hydrogenated oil constituting not over 30% by weight of the dispersed phase, whereby the impregnated leather body is stable, impervious to gases, resistant to lubricating oils, and pliable within a temperature range of at least from —50° C. to above 100° centigrade.

KENNETH H. KNIGHT.

REFERENCES CITED

The following references are of record in the file of this patent:

UNITED STATES PATENTS

| Number | Name | Date |
|---|---|---|
| 1,327,197 | Byers | June 6, 1920 |
| 1,682,652 | Whitney et al. | Aug. 28, 1928 |
| 2,120,083 | Arnold et al. | June 7, 1938 |
| 2,217,961 | McGill | Oct. 15, 1940 |